United States Patent
Hoshino et al.

(10) Patent No.: US 11,498,389 B2
(45) Date of Patent: Nov. 15, 2022

(54) VEHICLE AIR CONDITIONING CONTROL SYSTEM, NON-TRANSITORY COMPUTER READABLE MEDIUM STORING AIR CONDITIONING CONTROL PROGRAM, AND METHOD FOR CONTROLLING AIR CONDITIONING CONTROL SYSTEM

(71) Applicant: TOYOTA JIDOSHA KABUSHIKI KAISHA, Toyota (JP)

(72) Inventors: Yu Hoshino, Toyota (JP); Kunihiko Jinno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 418 days.

(21) Appl. No.: 16/705,329

(22) Filed: Dec. 6, 2019

(65) Prior Publication Data

US 2020/0223284 A1    Jul. 16, 2020

(30) Foreign Application Priority Data

Jan. 10, 2019    (JP) .............................. JP2019-002538

(51) Int. Cl.
*B60H 1/00*      (2006.01)

(52) U.S. Cl.
CPC ....... *B60H 1/00807* (2013.01); *B60H 1/0073* (2019.05)

(58) Field of Classification Search
CPC .......................... B60H 1/00807; B60H 1/0073
See application file for complete search history.

(56) References Cited

U.S. PATENT DOCUMENTS

| | | | |
|---|---|---|---|
| 2010/0206957 A1* | 8/2010 | Vyas .................. | B60H 1/00428 165/61 |
| 2014/0081481 A1 | 3/2014 | Nishida | |
| 2016/0207374 A1* | 7/2016 | Gauthier ............ | B60H 1/00742 |
| 2017/0203633 A1* | 7/2017 | High .................... | B60H 1/3232 |
| 2017/0225540 A1 | 8/2017 | Ito | |
| 2018/0222284 A1* | 8/2018 | Robert ............... | B60H 1/00821 |
| 2018/0334170 A1* | 11/2018 | Liu ........................ | B60W 10/30 |
| 2020/0361284 A1* | 11/2020 | Ragazzi ............. | B60H 1/00385 |

FOREIGN PATENT DOCUMENTS

| | | | | | |
|---|---|---|---|---|---|
| CN | 106335388 A | * | 1/2017 | ........ | B60H 1/00278 |
| CN | 108974008 B | * | 1/2021 | ........ | B60H 1/00735 |
| DE | 102015213097 A1 | * | 1/2017 | | |
| JP | 2006-298262 A | | 11/2006 | | |
| JP | 2010-234905 A | | 10/2010 | | |
| JP | 2016-117327 A | | 6/2016 | | |
| WO | WO 2012/157097 A1 | | 11/2012 | | |

\* cited by examiner

*Primary Examiner* — Nelson J Nieves
(74) *Attorney, Agent, or Firm* — Oblon, McClelland, Maier & Neustadt, L.L.P.

(57) ABSTRACT

An air conditioning control system includes processing circuitry. The processing circuitry includes an ambient temperature obtainment unit, a departure time estimation unit configured to estimate a departure time of a vehicle, an air conditioning condition calculator configured to calculate an operation period and an operation output that allow a passenger compartment temperature of the vehicle to reach a preset target temperature, an air conditioning start time determination unit configured to determine an activation time of an air conditioner, and an air conditioning controller. The air conditioning start time determination unit is configured to determine that the activation time is a time earlier than the departure time by the operation period.

8 Claims, 2 Drawing Sheets

Fig.1

VEHICLE AIR CONDITIONING CONTROL SYSTEM, NON-TRANSITORY COMPUTER READABLE MEDIUM STORING AIR CONDITIONING CONTROL PROGRAM, AND METHOD FOR CONTROLLING AIR CONDITIONING CONTROL SYSTEM

BACKGROUND

1. Field

The present disclosure relates to a vehicle air conditioning control system, a non-transitory computer readable medium storing an air conditioning control program, and a method for controlling an air conditioning control system.

2. Description of Related Art

International Patent Publication No. WO2012/157097 describes a vehicle air conditioning control system in which a data communication module installed on the vehicle, a server storing vehicle information, and a mobile terminal are connected through an external communication network. When the user inputs an operating instruction of a vehicle air conditioner to the mobile terminal, the mobile terminal transmits the operating instruction to the server through the external communication network. The operating instruction input to the server is output from the server and input to the data communication module through the external communication network. The operating instruction input to the data communication module is transmitted to the vehicle air conditioner. When the operating instruction input to the mobile terminal by the user is transmitted to the vehicle air conditioner, the air conditioner operates.

The air conditioner is activated and deactivated in accordance with an operating instruction input by the user to the mobile terminal. When the user does not input the operating instruction and a predetermined length of time (e.g., ten minutes) elapses since activation of the air conditioner, the air conditioner is automatically deactivated. Thus, even when the air conditioner is activated, the passenger compartment temperature of the vehicle may not be adjusted to the target temperature until the user provides a deactivation instruction or within the predetermined length of time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an air conditioning control system. The air conditioning control system includes processing circuitry. The processing circuitry includes an ambient temperature obtainment unit configured to obtain an ambient temperature of a vehicle, a departure time estimation unit configured to estimate a departure time of the vehicle, an air conditioning condition calculator configured to calculate an operation period of an air conditioner and an operation output of the air conditioner based on the ambient temperature, the air conditioner adjusting a passenger compartment temperature of the vehicle, an air conditioning start time determination unit configured to determine an activation time of the air conditioner, and an air conditioning controller configured to transmit an operation request signal for requesting operation of the air conditioner. The air conditioning condition calculator is configured to calculate the operation period and the operation output that allow the passenger compartment temperature of the vehicle to reach a preset target temperature. The air conditioning start time determination unit is configured to determine that the activation time is a time earlier than the departure time by the operation period. The air conditioning controller is configured to transmit the operation request signal at the activation time.

An aspect of the present disclosure provides a non-transitory computer readable medium that stores an air conditioning control program. When the air conditioning control program is run by one or more computers, the air conditioning control program causes the one or more computers to execute an ambient temperature obtaining process that obtains an ambient temperature of a vehicle, a departure time estimating process that estimates a departure time of the vehicle, an air conditioning condition calculating process that calculates an operation period of an air conditioner and an operation output of the air conditioner based on the ambient temperature, the air conditioner adjusting a passenger compartment temperature of the vehicle, an air conditioning start time determining process that determines an activation time of the air conditioner, and an air conditioning controlling process that transmits an operation request signal for requesting operation of the air conditioner. The air conditioning condition calculating process includes a process that calculates the operation period and the operation output that allow the passenger compartment temperature of the vehicle to reach a preset target temperature. The air conditioning start time determining process includes a process that determines that the activation time is a time earlier than the departure time by the operation period. The air conditioning controlling process includes a process that transmits the operation request signal at the activation time.

An aspect of the present disclosure provides a method for controlling an air conditioning control system. The method includes estimating a departure time of a vehicle, calculating an operation period of an air conditioner, the operation period being an estimated time for the air conditioner to adjust a passenger compartment temperature of the vehicle to a preset target temperature, and setting an activation time of the air conditioner to a time earlier than the estimated departure time by the calculated operation period.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

EMBODIMENTS OF THE DISCLOSURE

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of an air conditioning control system installed on an electric automobile will now be described with reference to the drawings.

The entire configuration of an air conditioning control system 10 will now be described.

Figure 1:
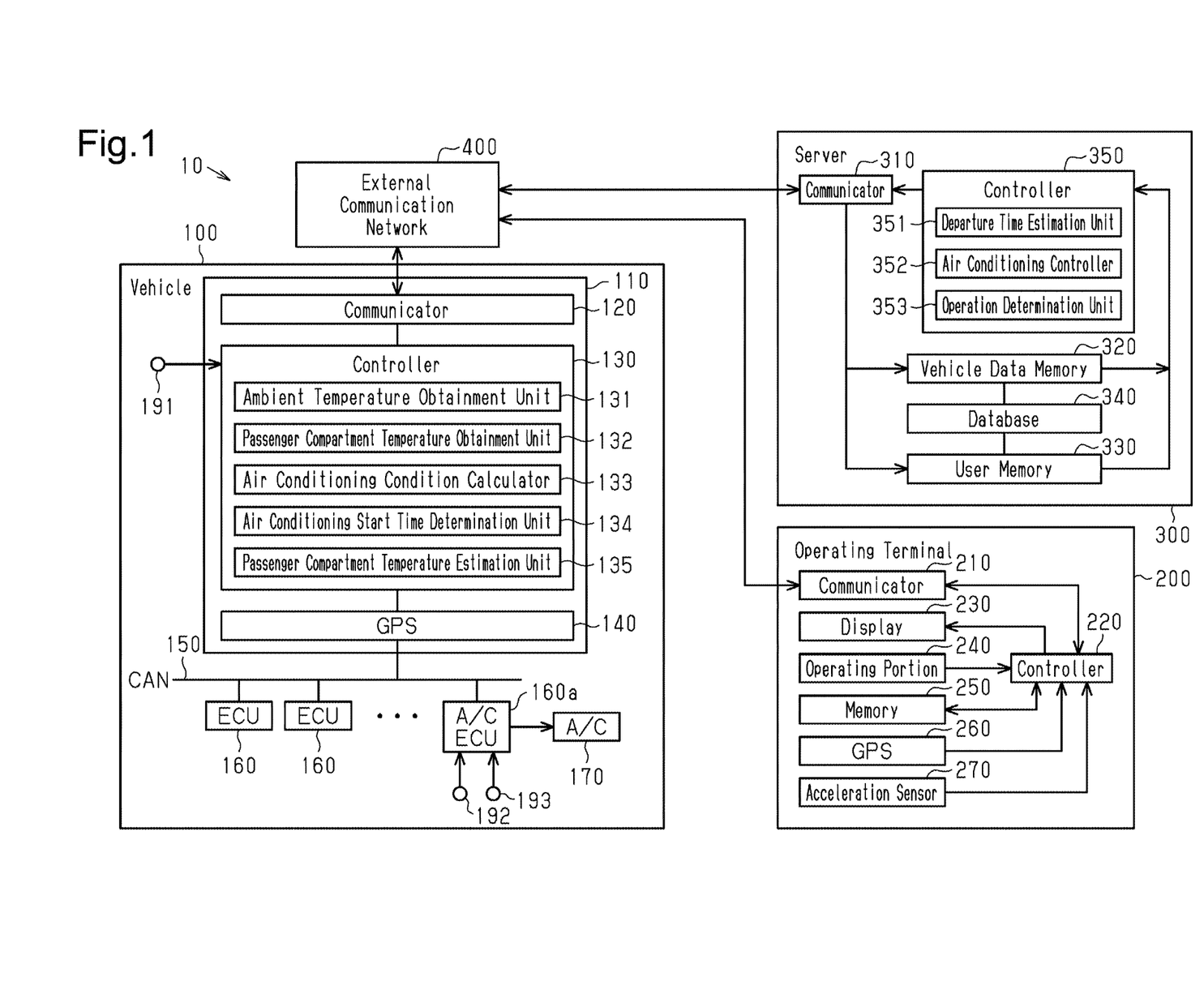
FIG. 1 is a schematic diagram of an air conditioning control system.

As shown in FIG. 1, the air conditioning control system 10 includes a control module 110 installed on a vehicle 100, an operating terminal 200, and a server 300 that collects and stores information on the vehicle 100. The control module 110, the operating terminal 200, and the server 300 are configured to perform information communication with each other through an external communication network 400.

The control module 110 of the vehicle 100 includes a communicator 120 that performs information communication with the server 300 through the external communication network 400, a controller 130 that executes various calculations and controls the information communication performed by the communicator 120 and transmission and reception of signals to and from ECUs 160, which will be described later, and a GPS 140 that detects the coordinate of the current position of the vehicle 100. In the present embodiment, the control module 110 incorporates a battery, which is not shown in the drawings. Hence, even when the external supply of power is cut off, the control module 110 is capable of receiving information sent to the control module 110.

The controller 130 receives a signal indicating a state of the vehicle 100 switched by a start switch 191 of the vehicle 100. The start switch 191 switches the state of the vehicle 100 between three states, namely, the OFF state, the ACC state, and the ON state. In the OFF state, the ECUs 160 (described later) are not supplied with power. When the vehicle 100 is in the OFF state and the start switch 191 is pushed, the vehicle 100 is switched to the ACC state. In the ACC state, the ECUs 160 (described later) are supplied with power from a low-voltage battery (not shown) but are not supplied with power from a high-voltage battery (not shown). In the ACC state, while various electric accessories installed on the vehicle 100 may be driven, the vehicle 100 cannot travel because power is not supplied to the drive motor. When the vehicle 100 is in the OFF state or the ACC state and the start switch 191 is pushed with the brake pedal depressed, the vehicle 100 is switched to the ON state. In the ON state, power is supplied from both the low-voltage battery and the high-voltage battery. More specifically, in the ON state, the vehicle 100 is allowed to travel. When the vehicle 100 is in the ON state and the start switch 191 is pushed, the vehicle 100 is switched to the OFF state. In addition to the ON state, the ACC state, and the OFF state, the vehicle 100 may enter a state in which only some of the ECUs 160 are supplied with power from the low-voltage battery.

When the vehicle 100 is switched to the ON state, the controller 130 transmits a signal indicating that the system of the vehicle 100 has been activated from the communicator 120 to the external communication network 400. In addition, when the vehicle 100 is in the ON state, the controller 130 transmits the coordinate of the current position of the vehicle 100 detected by the GPS 140 from the communicator 120 to the external communication network 400 at regular intervals. In the present embodiment, the communicator 120 transmits the coordinate of the current position of the vehicle 100 to the external communication network 400 at one-minute intervals. In addition, the controller 130 executes part of the process of advance air-conditioning before the vehicle 100 departs (hereafter, referred to as "pre-air-conditioning"). The configuration of the controller 130 related to the pre-air-conditioning will be described later in detail.

The control module 110 is connected to a CAN communication line 150 of a CAN communication system. The ECUs 160 are also connected to the CAN communication line 150 to control the vehicle 100. The control module 110 is configured to transmit and receive various signals to and from the ECUs 160 through the CAN communication line 150.

The vehicle 100 includes an air conditioning ECU160*a*, which is one of the ECUs 160 that controls operation of an air conditioner 170 of the vehicle 100. The air conditioner 170 includes an air compressor and a heat exchanger. The air conditioning ECU160*a* receives a signal indicating an ambient temperature OT of the vehicle 100 from an ambient temperature sensor 192 that measures the ambient temperature OT. The air conditioning ECU160*a* receives a signal indicating a passenger compartment temperature RT of the vehicle 100 from a passenger compartment temperature sensor 193 that measures the passenger compartment temperature RT. The air conditioning ECU160*a* drives the air conditioner 170 based on the ambient temperature OT and the passenger compartment temperature RT.

In the present embodiment, the operating terminal 200 is a mobile phone such as a smartphone carried by the user of the vehicle 100. The operating terminal 200 includes a communicator 210 configured to perform information communication with the server 300 through the external communication network 400 and a controller 220 that controls the information communication performed by the communicator 120 and executes various calculations. The controller 220 also executes part of the pre-air-conditioning process.

The operating terminal 200 further includes a display 230 that shows an output from the controller 220. The display 230 shows a message or an operation icon based on image information output from the controller 220.

The operating terminal 200 includes an operating portion 240 configured to input information to the controller 220. When the operating portion 240 is operated, an operating signal is input to the controller 220. In the present embodiment, the display 230 is a touchscreen, and the display 230 includes the operating portion 240.

The operating terminal 200 includes a memory 250 that stores application programs and various kinds of data. When the controller 220 receives a signal for activating an application program from the operating portion 240 or the server 300, the application program stored in the memory 250 runs.

The operating terminal 200 includes a GPS 260 that detects the coordinate of the current position of the operating terminal 200. The coordinate of the current position of the operating terminal 200 detected by the GPS 260 is input to the controller 220.

The operating terminal 200 includes an acceleration sensor 270 that measures acceleration of the operating terminal 200. The acceleration of the operating terminal 200 detected by the acceleration sensor 270 is input to the controller 220.

The server 300 includes a communicator 310 configured to perform information communication with the control module 110 and the operating terminal 200 through the external communication network 400 and a controller 350 that controls the information communication performed by the communicator 310 and executes various calculations. The controller 350 also executes part of the pre-air-conditioning process of the vehicle 100. The configuration of the controller 350 related to the pre-air-conditioning will be described later in detail.

The server 300 further includes a vehicle data memory 320 that controls vehicle information and a user memory 330 that controls user information. The vehicle data memory 320 and the user memory 330 share a database 340 that stores the vehicle information and the user information. The database 340 stores association information that associates information on the vehicle 100 with information on the user of the vehicle 100. More specifically, the database 340 links the information on the vehicle 100 with the information on the user of the vehicle 100.

In the air conditioning control system 10, the database 340 of the server 300 stores vehicle information received from the control module 110. The server 300 also stores user information received from the operating terminal 200. For example, when receiving a signal indicating that the vehicle 100 has entered the ON state, the vehicle data memory 320 stores the time at which the signal is received as a vehicle activation time. The vehicle activation time in the past few months is stored for each vehicle 100.

The configuration of the controller 130 in the control module 110 related to the pre-air-conditioning will now be described.

The controller 130 of the control module 110 includes an ambient temperature obtainment unit 131 that obtains the ambient temperature OT. When receiving a signal indicating the ambient temperature OT from the air conditioning ECU160a, the ambient temperature obtainment unit 131 obtains the ambient temperature OT.

The controller 130 of the control module 110 includes a passenger compartment temperature obtainment unit 132 that obtains the passenger compartment temperature RT. When receiving a signal indicating the passenger compartment temperature RT from the air conditioning ECU160a, the passenger compartment temperature obtainment unit 132 obtains the passenger compartment temperature RT.

The controller 130 of the control module 110 includes an air conditioning condition calculator 133 that calculates the operating condition of the air conditioner 170. The air conditioning condition calculator 133 calculates an operation period CT of the air conditioner 170, which adjusts the passenger compartment temperature RT of the vehicle 100, and a compressor rotation speed CR, which is an operation output of the air conditioner 170. The air conditioning condition calculator 133 calculates the operation period CT and the compressor rotation speed CR based on the ambient temperature OT obtained by the ambient temperature obtainment unit 131 and the passenger compartment temperature RT obtained by the passenger compartment temperature obtainment unit 132.

The controller 130 of the control module 110 includes an air conditioning start time determination unit 134 that determines an activation time of the air conditioner 170. The air conditioning start time determination unit 134 determines the activation time of the air conditioner 170 based on the departure time estimated by the controller 350 of the server 300.

The controller 130 of the control module 110 includes a passenger compartment temperature estimation unit 135 that estimates an estimation passenger compartment temperature PRT at the departure time estimated by the controller 350 of the server 300 when the pre-air-conditioning is not performed. More specifically, the estimation passenger compartment temperature PRT at the departure time of the vehicle 100 is a passenger compartment temperature that is assumed at the departure time of the vehicle 100 when the passenger compartment temperature is not adjusted by the air conditioner 170 of the vehicle 100. The passenger compartment temperature estimation unit 135 estimates the estimation passenger compartment temperature PRT based on the passenger compartment temperature RT obtained by the passenger compartment temperature obtainment unit 132, the departure time estimated by the controller 350 of the server 300, and the present time.

The controller 130, or a computer, runs programs stored in the controller 130 to implement each of the processes executed by the ambient temperature obtainment unit 131, the passenger compartment temperature obtainment unit 132, the air conditioning condition calculator 133, the air conditioning start time determination unit 134, and the passenger compartment temperature estimation unit 135.

The configuration of the controller 350 in the server 300 related to the pre-air-conditioning will now be described.

The controller 350 of the server 300 includes a departure time estimation unit 351 that estimates a departure time of the vehicle 100, that is, an estimated time at which the user enters the vehicle 100 and starts the vehicle 100.

In the present embodiment, the departure time estimation unit 351 determines that the vehicle activation time, at which the vehicle 100 entered the ON state, stored by the vehicle data memory 320 in the database 340 is a time at which the vehicle 100 was started in the past. The departure time estimation unit 351 takes statistics of the frequency of departures of the vehicle 100 and the time of each departure in the past twenty-four hours. The statistics estimates that the vehicle 100 will enter the ON state at a time when the frequency of departures of the vehicle 100 is greater than a predetermined threshold value. The departure time estimation unit 351 estimates that an estimated time at which the vehicle 100 enters the ON state for the first time after the current time is the departure time of the vehicle 100 at which the vehicle 100 starts to travel the next time. An example of the departure time estimating process executed by the departure time estimation unit 351 is a technique disclosed in Japanese Laid-Open Patent Publication No. 2013-233013.

The controller 350 of the server 300 includes an air conditioning controller 352 that outputs an operation request signal for requesting operation of the air conditioner 170. When an activation time of the air conditioner 170 for the pre-air-conditioning determined by the air conditioning start time determination unit 134 is reached, the air conditioning controller 352 transmits the operation request signal to the control module 110 of the vehicle 100. The operation request signal received by the control module 110 of the vehicle 100 is input to the air conditioning ECU160a via the control module 110, and the air conditioning ECU160a drives the air conditioner 170.

The controller 350 of the server 300 includes an operation determination unit 353 that determines whether to perform the pre-air-conditioning. The operation determination unit 353 determines whether to perform the pre-air-conditioning based on an operating instruction from the operating terminal 200.

The controller 350, or a computer, runs programs stored in the controller 350 to implement each of the processes executed by the departure time estimation unit 351, the air conditioning controller 352, and the operation determination unit 353.

Figure 2:
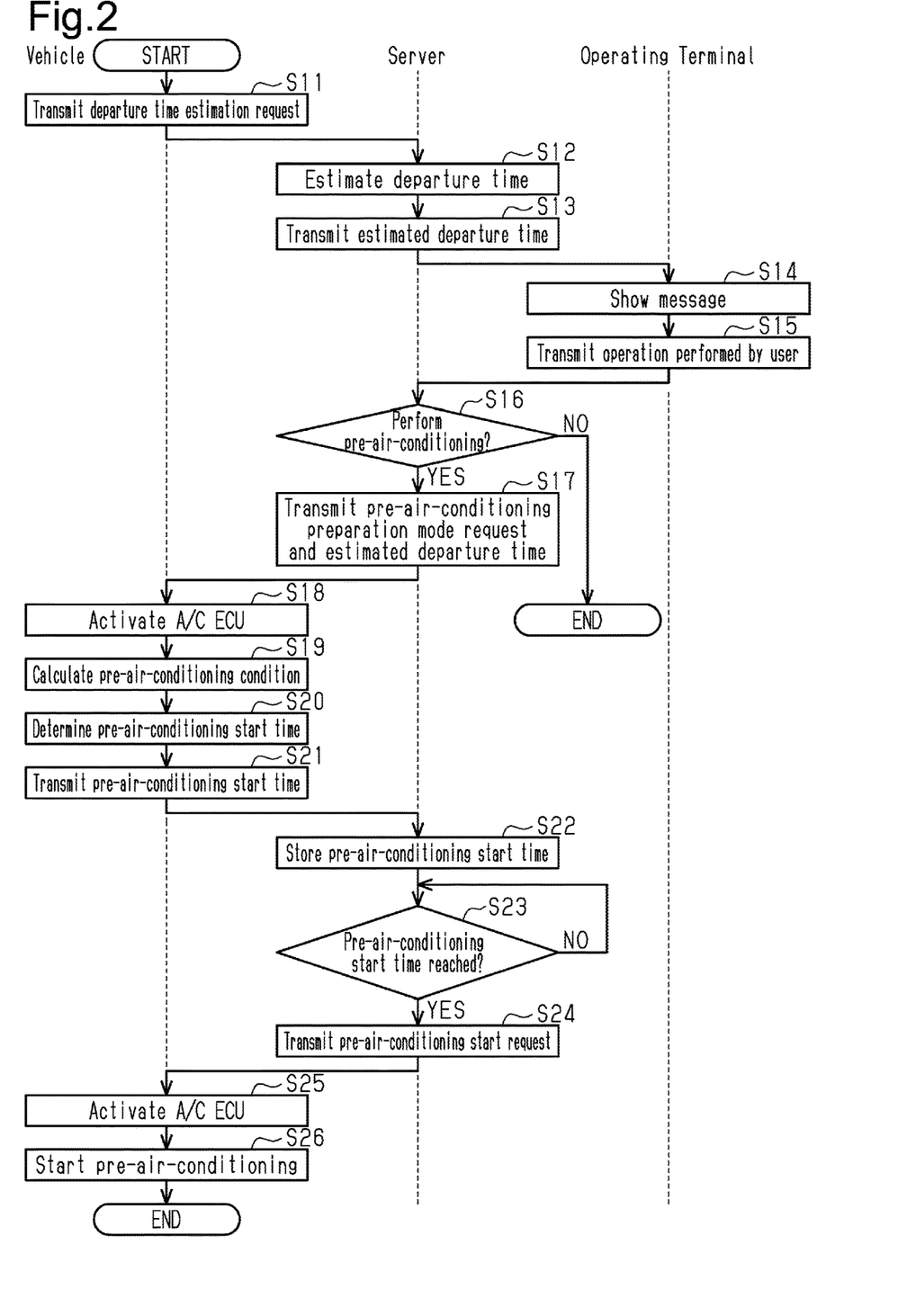
FIG. 2 is a flowchart showing a pre-air-conditioning process.

The process of the pre-air-conditioning in the air conditioning control system 10 will now be described with reference to FIG. 2.

When the start switch 191 is pushed so that the vehicle 100 is switched to the OFF state, the controller 130 of the control module 110 starts control of the pre-air-conditioning in the present embodiment.

In step S11, the controller 130 of the control module 110 transmits a signal indicating a departure time estimation request to the server 300. Subsequently, the power supplied to the ECUs 160 of the vehicle 100 is cut off. More specifically, the vehicle 100 enters the OFF state. The power supplied to the control module 110 is also cut off. However, the control module 110 enters a standby state that allows reception of information from the server 300.

When the departure time estimation request is input to the server 300, the controller 350 of the server 300 proceeds to step S12. In step S12, the departure time estimation unit 351 of the controller 350 estimates a departure time (hereafter, referred to as estimated departure time), that is, an estimated time at which the user enters the vehicle 100 and starts the vehicle 100 based on vehicle information and user information. The controller 350 of the server 300 proceeds to step S13.

In step S13, the controller 350 of the server 300 transmits a signal indicating the estimated departure time to the operating terminal 200.

When the signal indicating the estimated departure time is input to the operating terminal 200, the controller 220 of the operating terminal 200 proceeds to step S14. In step S14, the controller 220 of the operating terminal 200 shows, on the display 230, the estimated departure time and a message asking the user of the vehicle 100 whether to perform the pre-air-conditioning by the estimated departure time. The controller 220 of the operating terminal 200 proceeds to step S15.

In step S15, the controller 220 of the operating terminal 200 transmits an operating instruction input by the user to the server 300. More specifically, when the operating portion 240 is operated so that the pre-air-conditioning is performed, the controller 220 of the operating terminal 200 transmits a signal indicating that the pre-air-conditioning is to be performed. When the operating portion 240 is operated so that the pre-air-conditioning is not performed, the controller 220 of the operating terminal 200 transmits a signal indicating that the pre-air-conditioning is not to be performed. When the operating portion 240 is not operated in a predetermined length of time (e.g., ten minutes), the controller 220 of the operating terminal 200 transmits a signal indicating that the operating portion 240 is not operated.

When the signal from the operating terminal 200 is input to the server 300, the controller 350 of the server 300 proceeds to step S16. In step S16, in the controller 350 of the server 300, the operation determination unit 353 determines whether to perform the pre-air-conditioning. More specifically, when it is determined that the server 300 receives a signal indicating that the pre-air-conditioning is to be performed, the operation determination unit 353 determines that the pre-air-conditioning is to be performed. When it is determined that the server 300 receives a signal indicating that the pre-air-conditioning is not performed or a signal indicating that the operating portion 240 is not operated, the operation determination unit 353 determines not to perform the pre-air-conditioning. In step S16, when it is determined that the pre-air-conditioning is not performed (S16: NO), the controller 350 of the server 300 ends the control of the pre-air-conditioning. In step S16, when it is determined that the pre-air-conditioning is performed (S16: YES), the controller 350 of the server 300 proceeds to step S17.

In step S17, the controller 350 of the server 300 transmits signals indicating a pre-air-conditioning preparation mode request and the estimated departure time to the control module 110.

When the control module 110 receives the signals indicating the pre-air-conditioning preparation mode request and the estimated departure time, the controller 130 of the control module 110 proceeds to step S18. In step S18, the controller 130 of the control module 110 performs control so that the controller 130 and the air conditioning ECU160a are supplied with power from a battery (not shown). This activates the controller 130 from the standby state and also activates the air conditioning ECU160a. The controller 130 of the control module 110 proceeds to step S19.

In step S19, in the controller 130 of the control module 110, the air conditioning condition calculator 133 calculates the operation period CT of the air conditioner 170 for the pre-air-conditioning and the compressor rotation speed CR of the air conditioner 170 for the pre-air-conditioning. The air conditioning condition calculator 133 calculates the operation period CT and the compressor rotation speed CR for the pre-air-conditioning so that the passenger compartment temperature RT of the vehicle 100 reaches a preset target temperature. More specifically, the operation period CT is a period estimated for the air conditioner 170 to adjust the passenger compartment temperature RT of the vehicle 100 to the preset target temperature. The target temperature corresponds to the temperature that is set in the air conditioning ECU160a of the vehicle 100 by the user, that is, the temperature set when the vehicle 100 is deactivated.

More specifically, the air conditioning condition calculator 133 calculates the compressor rotation speed CR as a predetermined target rotation speed. It is determined that the target rotation speed is a rotation speed that achieves the greatest air compression efficiency of an air compressor of the air conditioner 170 in relation to power consumption. That is, in the present embodiment, the condition for achieving the greatest efficiency of the air compressor of the air conditioner 170 is the condition for minimizing the power consumption. The target rotation speed described above is a theoretical value and may not actually achieve the greatest efficiency of air compression due to a control delay or an environmental factor even when the compressor rotation speed CR reaches the target rotation speed.

The ambient temperature obtainment unit 131 of the control module 110 obtains the ambient temperature OT. The passenger compartment temperature obtainment unit 132 of the control module 110 obtains the passenger compartment temperature RT. The controller 130 of the control module 110 obtains a target temperature that is set in the air conditioning ECU160a. The passenger compartment temperature estimation unit 135 of the control module 110 estimates the estimation passenger compartment temperature PRT based on the passenger compartment temperature RT and the estimated departure time. The air conditioning condition calculator 133 assumes that the rotation speed of the air compressor of the air conditioner 170 is the compressor rotation speed CR and calculates the operation period CT using the ambient temperature OT and the difference between the estimation passenger compartment temperature PRT and the ambient temperature OT with reference to a predetermined operating condition map. Then, the controller 130 of the control module 110 proceeds to step S20. The operating condition map is set in advance based on, for example, tests or simulations so that the compressor rotation speed CR and the operation period CT are calculated in accordance with the interior capacity of the vehicle 100 and the type of the air conditioner 170 installed on the vehicle 100.

In step S20, in the controller 130 of the control module 110, the air conditioning start time determination unit 134 determines an activation time of the air conditioner 170 for the pre-air-conditioning. More specifically, the air conditioning start time determination unit 134 determines that the activation time for starting the pre-air-conditioning is a time earlier than the estimated departure time, which is input to the control module 110, by the calculated operation period CT. The controller 130 of the control module 110 proceeds to step S21.

In step S21, the controller 130 of the control module 110 transmits a signal indicating the determined activation time to the server 300. Subsequently, the controller 130 of the control module 110 stops the supply of power to the air conditioning ECU160a from the battery (not shown) so that the air conditioning ECU160a enters the OFF state. At this time, the control module 110 is switched to the standby state. When the server 300 receives the signal indicating the activation time, the controller 350 of the server 300 proceeds to step S22.

In step S22, the controller 350 of the server 300 causes the vehicle data memory 320 to store the new activation time in the database 340. The controller 350 of the server 300 proceeds to step S23.

In step S23, the controller 350 of the server 300 determines whether the current time reaches the activation time. When it is determined that the current time has not reached the activation time (S23: NO), the controller 350 of the server 300 repeats step S23 in a predetermined time. When it is determined that the current time has reached the activation time (S23: YES), the controller 350 of the server 300 proceeds to step S24.

In step S24, in the controller 350 of the server 300, the air conditioning controller 352 transmits a signal indicating the operation request signal that requests the air conditioner 170 to perform the pre-air-conditioning to the control module 110.

When the control module 110 receives the signal indicating the operation request signal, the controller 130 of the control module 110 proceeds to step S25. In step S25, the controller 130 of the control module 110 performs control so that the controller 130 and the air conditioning ECU160a are supplied with power from the battery (not shown). This activates the controller 130 from the standby state and also activates the air conditioning ECU160a. The controller 130 of the control module 110 proceeds to step S26.

In step S26, the controller 130 of the control module 110 causes the air conditioning ECU160a to start the pre-air-conditioning of the air conditioner 170 in accordance with the compressor rotation speed CR and the operation period CT. Subsequently, the controller 130 of the control module 110 ends the control of the pre-air-conditioning.

In step S23, while the controller 350 of the server 300 is repeating determination that the current time is not the activation time for the pre-air-conditioning, the user may enter the vehicle 100 and start and stop the vehicle 100. More specifically, prior to the activation time for the pre-air-conditioning, the user may enter the vehicle 100 and start and stop the vehicle 100. In this case, when the start switch 191 is pushed to switch the vehicle 100 to the OFF state, the air conditioning control system 10 restarts the process of the pre-air-conditioning from the beginning and calculates a new start time of the pre-air-conditioning. In this case, in step S22 of the restarted process for the pre-air-conditioning, when a new activation time for the pre-air-conditioning is calculated, the activation time for the pre-air-conditioning calculated in the restarted process for the pre-air-conditioning is overwritten on the previous activation time.

The operation and advantages of the present embodiment will now be described.

(1) In the present embodiment, the departure time of the vehicle 100 is estimated so that the time to complete the pre-air-conditioning is set. Thus, the operation period CT for the pre-air-conditioning is adjusted so that the passenger compartment temperature RT of the vehicle 100 reaches the target temperature at the departure time. More specifically, the operation period CT for the pre-air-conditioning is adjusted to be within the period between the current time and the departure time. For example, when the passenger compartment temperature RT of the vehicle 100 is much higher than the target temperature, the operation period CT for the pre-air-conditioning may extend and the start time of the pre-air-conditioning may be relatively advanced so that the passenger compartment temperature RT of the vehicle 100 is sufficiently decreased to the target temperature. When the passenger compartment temperature RT of the vehicle 100 is slightly higher than the target temperature, the operation period CT for the pre-air-conditioning may shorten and the start time of the pre-air-conditioning may be relatively delayed. As a result, the time at which the passenger compartment temperature RT of the vehicle 100 reaches the target temperature may be adjusted to coincide with the departure time. This obviates energy consumption for maintaining the target temperature until the departure time when the passenger compartment temperature RT of the vehicle 100 has been decreased to the target temperature before the departure time. As described above, in the present embodiment, the passenger compartment temperature RT of the vehicle 100 is highly likely to be close to the target temperature at the departure time. Thus, excess energy consumption of the pre-air-conditioning is limited while appropriately adjusting the passenger compartment temperature RT.

(2) In the present embodiment, in the controller 130 of the control module 110, after the start time of the pre-air-conditioning is determined, the start time of the pre-air-conditioning is stored in the server 300, and the server 300 determines whether the current time has reached the start time of the pre-air-conditioning. Then, after transmitting a signal indicating the start time of the pre-air-conditioning to the external communication network 400, the control module 110 stops the supply of power to the air conditioning ECU160a until receiving a signal indicating the pre-air-conditioning start request from the server 300. This limits power consumption of the air conditioning ECU160a in the vehicle 100 until the start time of the pre-air-conditioning.

(3) In the present embodiment, the user operates the operating terminal 200, and a signal output from the operating terminal 200 determines whether the server 300 activates the air conditioner 170 of the vehicle 100. More specifically, the output from the operating terminal 200 stops the air conditioning controller 352 from outputting the operation request signal. Thus, unnecessary power consumption due to activation of the air conditioner 170 is avoided when the user determines that the pre-air-conditioning does not need to be performed.

(4) In the present embodiment, the server 300 determines whether to perform the pre-air-conditioning. This determination of the server 300 is made before the control module 110 calculates the operation period CT and the compressor rotation speed CR for the pre-air-conditioning. Thus, when the user determines that the pre-air-conditioning does not need to be performed, the air conditioning condition calculator 133 of the control module 110 does not calculate the operation period CT and the compressor rotation speed CR for the pre-air-conditioning. In this case, the processing load on the air conditioning condition calculator 133 is reduced.

(5) In the present embodiment, the control module 110 includes the air conditioning condition calculator 133. This allows various parameters for calculating the operation period CT and the compressor rotation speed CR to be set in accordance with the vehicle 100 on which the control module 110 is installed and the type of the air conditioner 170. The operation period CT and the compressor rotation speed CR are accurately calculated as compared to a case in which the operation period CT and the compressor rotation speed CR are uniformly calculated regardless of the vehicle 100 and the type of the air conditioner 170.

(6) In the present embodiment, the air conditioning condition calculator 133 calculates the operation period CT and the compressor rotation speed CR that minimize power consumption of the air conditioner 170 for adjusting the passenger compartment temperature RT of the vehicle 100 to the target temperature. Thus, while the air conditioner 170 of the vehicle 100 adjusts the passenger compartment temperature RT of the vehicle 100 to the target temperature at the departure time, power consumption of the air conditioner 170 in the vehicle 100 is minimized until the departure time.

(7) Even when the ambient temperature OT and the target temperature remain the same, the operation period CT and the compressor rotation speed CR of the air conditioner 170 for adjusting the passenger compartment temperature RT to the target temperature may vary if the passenger compartment temperature RT varies. In addition, when the interval between when the passenger compartment temperature RT is obtained and the departure time of the vehicle 100 is long, the obtained passenger compartment temperature RT deviates from the actual passenger compartment temperature RT at the departure time of the vehicle 100. Such deviation of the passenger compartment temperature RT may adversely affect the accuracy of calculating the operation period CT and the compressor rotation speed CR for the air conditioner 170.

In the present embodiment, the operation period CT and the compressor rotation speed CR are calculated based on the passenger compartment temperature RT adjusted by the vehicle air conditioner. This allows further accurate calculation of the operation period CT and the compressor rotation speed CR when adjusting the passenger compartment temperature of the vehicle to the target temperature at the departure time. In the present embodiment, the air conditioning condition calculator 133 calculates the operation period CT and the compressor rotation speed CR based on the difference between the ambient temperature OT and the estimation passenger compartment temperature PRT estimated by the passenger compartment temperature estimation unit 135. Thus, even when there is a relatively long interval between when the passenger compartment temperature RT is obtained and the departure time and the passenger compartment temperature RT largely changes, the air conditioning condition calculator 133 accurately calculates the operation period CT and the compressor rotation speed CR.

The embodiment may be modified as follows. The present embodiment and the following modified examples may be combined as long as the combined modified examples remain technically consistent with each other.

In the embodiment, the passenger compartment temperature obtainment unit 132 obtains the passenger compartment temperature RT. However, this is only an example. For example, the passenger compartment temperature RT may be estimated based on the ambient temperature OT. More specifically, a passenger compartment temperature estimation map may be used to estimate the passenger compartment temperature RT that is left at the ambient temperature OT between the current time and the start time of the pre-air-conditioning without activating the air conditioner 170. In this case, the passenger compartment temperature estimation map may be created in advance based on, for example, tests or simulations.

The estimation passenger compartment temperature PRT at the estimated departure time does not have to be calculated. In this case, the operation period CT may be calculated based on the ambient temperature OT and the difference between the passenger compartment temperature RT and the ambient temperature OT. For example, when the vehicle 100 is highly hermetic and the passenger compartment temperature RT subtly changes, the operation period CT may be calculated somewhat accurately without calculation of the estimation passenger compartment temperature PRT.

The air conditioning condition calculator 133 may calculate the operation period CT and the compressor rotation speed CR regardless of the estimation passenger compartment temperature PRT and the passenger compartment temperature RT. In this case, the operation period CT and the compressor rotation speed CR may be calculated based on at least the ambient temperature OT.

In the embodiment, the ambient temperature sensor 192 obtains the ambient temperature OT. However, this is only an example. For example, from data on the coordinate of the current position obtained by the GPS 140 of the control module 110 installed on the vehicle 100, the server 300 may obtain meteorological data on the coordinate of the current position of the vehicle 100 via the external communication network 400.

The process executed by the air conditioning condition calculator 133 for calculating the operation period CT and the compressor rotation speed CR that minimize power consumption of the air conditioner 170 for adjusting the passenger compartment temperature RT of the vehicle 100 to the target temperature is not limited to that described in the present embodiment. For example, when the passenger compartment temperature RT is much higher than the target temperature, the ambient temperature OT is between the passenger compartment temperature RT and the target temperature, and the passenger compartment temperature RT slightly differs from the ambient temperature OT, the operation period CT for the pre-air-conditioning may shorten and the compressor rotation speed CR may be increased. In this case, since the ambient temperature OT is high, even when the passenger compartment temperature RT is decreased, the vehicle 100 is readily warmed by the ambient air. Thus, when the operation period CT shortens, loss of power consumption is limited. On the other hand, when the passenger compartment temperature RT largely differs from the ambient temperature OT, the operation period CT of the pre-air-conditioning may extend and the compressor rotation speed CR may be reduced. In this case, since the ambient temperature OT is low, when the passenger compartment temperature RT is decreased, the vehicle 100 is relatively resistant to the warming by the ambient air. Thus, when the compressor rotation speed CR is set to an efficient value and the operation period CT extends, power consumption of the air conditioner 170 is limited. As described above, the phrase "minimize consumption power" does not mean an absolute minimum value and may be a minimum value in the view of an aspect such as a minimum value taking account of the efficiency of the air conditioner 170 or a minimum value taking account of a meteorological condition.

When calculating the operation period CT and the compressor rotation speed CR, power consumption of the air conditioner 170 does not need to be a minimum value. For example, the compressor rotation speed CR may be calculated with an allowable range that is 10% above and below the value achieving the greatest efficiency. When the compressor rotation speed CR is set within this range, the air conditioner 170 efficiently runs. The compressor rotation speed CR and the operation period CT may be calculated regardless of the efficiency of the air conditioner 170. In any case, the compressor rotation speed CR and the operation period CT may be set so that the passenger compartment temperature RT reaches the target temperature at the estimated departure time.

The ambient temperature obtainment unit 131, the air conditioning condition calculator 133, the air conditioning start time determination unit 134, the passenger compartment temperature estimation unit 135, the departure time estimation unit 351, the air conditioning controller 352, and the operation determination unit 353 may be mounted on any position of the air conditioning control system 10. For example, when the air conditioning control system 10 is configured by only the control module 110, the departure time estimation unit 351, the air conditioning controller 352, and the operation determination unit 353 may be included in the controller 130 of the control module 110.

The air conditioning condition calculator 133 may be included in the server 300 or the operating terminal 200. In this case, the controller 350 of the server 300 and the controller 220 of the operating terminal 200 are also configured to calculate the operation period CT and the compressor rotation speed CR based on the ambient temperature OT so that the target temperature is reached by the departure time. In such cases, when the vehicle data memory 320 of the server 300 and the operating terminal 200 store information on the vehicle 100 and the type of the air conditioner 170, the operation period CT and the compressor rotation speed CR are accurately calculated.

The air conditioning ECU160a may include the ambient temperature obtainment unit 131 and the air conditioning condition calculator 133. Also, in this case, the air conditioner 170 may perform the pre-air-conditioning.

The operation determination unit 353 may determine whether to perform the pre-air-conditioning after the air conditioning condition calculator 133 calculates the operation period CT and the compressor rotation speed CR. Also, in this case, when the operation determination unit 353 determines not to perform the pre-air-conditioning before the controller 350 of the server 300 outputs the pre-air-conditioning start request, activation of the air conditioner 170 for the pre-air-conditioning is stopped.

The determination of whether to perform the pre-air-conditioning (step S16) may be omitted so that the pre-air-conditioning is constantly performed. In this case, steps S13 to S15 may be omitted.

The process for estimating the departure time of the vehicle 100 executed by the departure time estimation unit 351 is not limited to that of the present embodiment. For example, whether the vehicle 100 is moving may be determined based on data on the coordinate of the current position detected by the GPS 140 of the vehicle 100. When the vehicle 100 starts to move, it may be assumed that the vehicle 100 departs so that the departure time of the vehicle 100 is estimated.

The departure time estimation unit 351 may estimate the departure time of the vehicle 100 based on information from the operating terminal 200. For example, acceleration is measured by the acceleration sensor 270 of the operating terminal 200 and input to the controller 220 of the operating terminal 200. The controller 220 determines that the acceleration is greater than a predetermined threshold value. The threshold value may be set to an acceleration that is obtained when the user performs an action expected before departure such as brushing teeth, changing clothes, cooking, or exercising. The controller 220 transmits a signal indicating a time at which the acceleration is increased to the server 300. In addition, the database 340 of the server 300 stores the frequency and the times of increases in the acceleration of the user. The departure time estimation unit 351 may estimate that the vehicle 100 will depart after a fixed length of time from when the acceleration is increased. In this case, it may be assumed that the time from when the user performs an action expected before departure to when the user enters the vehicle 100 and starts the vehicle 100 is substantially fixed. Thus, the departure time of the vehicle 100 is estimated.

The departure time of the vehicle 100 may be estimated based on data on the coordinate of the current position of the vehicle 100 detected by the GPS 140 of the vehicle 100 and data on the coordinate of the current position of the operating terminal 200 detected by the GPS 260 of the operating terminal 200. In this case, in the same manner as the GPS 140 of the vehicle 100, the GPS 260 of the operating terminal 200 outputs data on the coordinate of the current position of the operating terminal 200 at regular intervals. In addition, the database 340 of the server 300 stores data on the coordinate of the current position of the vehicle 100 and data on the coordinate of the current position of the operating terminal 200. The departure time estimation unit 351 of the server 300 detects times at which the coordinate of the current position of the vehicle 100 becomes equal to the coordinate of the current position of the operating terminal 200 from a state in which the coordinates differ from each other and takes statistics of the frequency and the times. From the statistics, the departure time estimation unit 351 may estimate that a time at which the coordinate of the current position of the vehicle 100 becomes equal to the coordinate of the current position of the operating terminal 200 from a state in which the coordinates differ from each other is the departure time of the vehicle 100.

When the user inputs schedule information to the memory 250 of the operating terminal 200 and the schedule information includes a planned departure time input by the user, the departure time estimation unit 351 may estimate that the planned departure time is the departure time of the vehicle 100.

The output value of the air conditioner 170 is not limited to the compressor rotation speed CR. For example, a blower temperature, an airflow amount, or an evaporator rear temperature of the air conditioner 170 may be used.

The location where the programs are stored is not limited to that of the present embodiment. For example, the controller 220 of the server 300 may store the programs implementing the processes executed by the ambient temperature obtainment unit 131, the air conditioning condition calculator 133, the air conditioning start time determination unit 134, and the passenger compartment temperature estimation unit 135. The memory 250 of the operating terminal 200 may store the programs as application programs.

The controller 130 of the vehicle 100 and the controller 350 of the server 300 each include a memory that stores a program and an arithmetic processing circuit that runs the program and thus execute a software process. The operating terminal 200 includes the memory 250 storing a program and the controller 220 running the program and thus executes a software process. However, these are only examples. The controller 130 of the vehicle 100, the controller 350 of the server 300, and the operating terminal 200 may each include a dedicated hardware circuit (e.g., ASIC) that processes some of the software processes executed in the embodiment. More specifically, the controller 130 of the vehicle 100, the controller 350 of the server 300, and the operating terminal 200 may each have any one of the following configurations (a) to (c). Configuration (a) includes a processor that executes all of the above-described processes in accordance with programs and a program storage device such as a memory that stores the programs. Configuration (b) includes a processor and a program storage device that execute some of the above-described processes in accordance with the programs and a dedicated hardware circuit that executes the remaining processes. Configuration (c) includes a dedicated hardware circuit that executes all of the above-described processes. A plurality of software circuits each including a processor and a program storage device and a plurality of dedicated hardware circuits may be provided. More specifically, the above-described processes may be executed by processing circuitry that includes at least one of one or more software circuits or one or more dedicated hardware circuits. The program storage device, or a computer readable medium, includes any medium that is accessible by a general-purpose computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An air conditioning control system, comprising:
   an operating terminal;
   a control module installed on a vehicle, wherein the operating terminal and the control module are connected by an external communication network;
   processing circuitry configured to:
      obtain an ambient temperature of the vehicle;
      estimate a departure time of the vehicle;
      calculate an operation period of an air conditioner and an operation output of the air conditioner based on the ambient temperature, wherein the air conditioner adjusts a passenger compartment temperature of the vehicle;
      determine an activation time of the air conditioner;
      transmit an operation request signal for requesting operation of the air conditioner;
      calculate the operation period and the operation output that allow the passenger compartment temperature of the vehicle to reach a preset target temperature;
      determine that the activation time is a time earlier than the departure time by the operation period; and
      transmit the operation request signal at the activation time; and
      determine whether the operation request signal is transmitted at the activation time based on information output from the operating terminal.

2. The air conditioning control system according to claim 1, further comprising:
   a server configured to collect and store information on the vehicle; and
   a control module installed on the vehicle, wherein the server and the control module are connected by an external communication network.

3. The air conditioning control system according to claim 1, wherein before the processing circuitry calculates the operation period and the operation output, the processing circuitry is configured to determine the operation request signal is transmitted at the activation time.

4. The air conditioning control system according to claim 1, wherein the processing circuitry is further configured to calculate the operation period and the operation output so that power consumption of the air conditioner for adjusting the passenger compartment temperature of the vehicle to the target temperature is minimized.

5. The air conditioning control system according to claim 1, wherein the processing circuitry is further configured to:
   obtain the passenger compartment temperature of the vehicle; and
   calculate the operation period and the operation output based on a difference between the ambient temperature and the passenger compartment temperature.

6. The air conditioning control system according to claim 1, wherein the processing circuitry is further configured to:
   obtain the passenger compartment temperature of the vehicle;
   estimate an estimation passenger compartment temperature at the departure time of the vehicle based on the passenger compartment temperature; and
   calculate the operation period and the operation output based on a difference between the ambient temperature and the estimation passenger compartment temperature.

7. A non-transitory computer readable medium storing an air conditioning control program that, when run by one or more computers, causes the one or more computers to execute
   an ambient temperature obtaining process that obtains an ambient temperature of a vehicle,
   a departure time estimating process that estimates a departure tune of the vehicle,
   an air conditioning condition calculating process that calculates an operation period of an air conditioner and an operation output of the air conditioner based on the ambient temperature, wherein the air conditioner adjusts a passenger compartment temperature of the vehicle, an air conditioning start time determining process that determines an activation time of the air conditioner, an air conditioning controlling process that transmits an operation request signal for requesting operation of the air conditioner, wherein the air conditioning condition calculating process includes a process that calculates the operation period and the operation output that allow the passenger compartment temperature of the vehicle to reach a preset target temperature, the air conditioning start time determining process includes a process that determines that the activation time is a time earlier than the departure time by the operation period, and the air conditioning controlling process includes a process that transmits the operation request signal at the activation time, and an operation determination process includes a process that determines whether the operation request signal is transmitted at the activation time based on information output from an operating terminal.

8. A method for controlling an air conditioning control system, the method comprising:

obtaining an ambient temperature of a vehicle;

estimating a departure time of a vehicle;

calculating an operation period of an air conditioner and an operation output of the air conditioner based on the ambient temperature, wherein the air conditioner adjusts a passenger compartment temperature of the vehicle;

determining an activation time of the air conditioner;

transmitting an operation request signal for requesting operation of the air conditioner;

calculating the operation period and the operation output that allow the passenger compartment temperature of the vehicle to reach a preset target temperature;

determining that the activation time is a time earlier than the departure time by the operation period;

transmitting the operation request signal at the activation time; and determining whether the operation request signal is transmitted at the activation time based on information output from an operating terminal.

* * * * *